United States Patent [19]

Dale

[11] Patent Number: 4,750,404
[45] Date of Patent: Jun. 14, 1988

[54] AIRCRAFT MISSILE LAUNCHER SNUBBER APPARATUS

[75] Inventor: Ronald L. Dale, Royse City, Tex.

[73] Assignee: VARO, Inc., Garland, Tex.

[21] Appl. No.: 34,905

[22] Filed: Apr. 6, 1987

[51] Int. Cl.[4] .................... F41F 3/06; F41F 7/00
[52] U.S. Cl. .................. 89/1.819; 89/1.53; 89/1.58
[58] Field of Search .......... 89/1.53, 1.58, 1.59, 89/1.1, 1.819, 1.806, 1.812; 166/215; 403/369, 374

[56] References Cited

U.S. PATENT DOCUMENTS

| | | | |
|---|---|---|---|
| 1,118,538 | 11/1914 | Driscoll | 166/215 |
| 1,147,108 | 7/1915 | McKissick | 166/215 X |
| 3,040,629 | 6/1962 | Duncan et al. | 89/1.806 |
| 3,115,059 | 12/1963 | Moul | 89/1.819 |
| 3,170,371 | 2/1965 | Zimmer et al. | 89/1.819 X |
| 3,983,785 | 10/1976 | Dissmeyer et al. | 89/1.819 X |
| 4,196,879 | 4/1980 | Cragie | 89/1.53 X |
| 4,392,411 | 7/1983 | Minkler | 89/1.806 X |
| 4,660,456 | 4/1987 | Griffin et al. | 89/1.819 |

FOREIGN PATENT DOCUMENTS

| | | | |
|---|---|---|---|
| 2731103 | 7/1977 | Fed. Rep. of Germany | 89/1.53 |
| 2070742 | 9/1981 | United Kingdom | 89/1.58 |

*Primary Examiner*—David H. Brown
*Attorney, Agent, or Firm*—Jerry W. Mills; Roger N. Chauza

[57] ABSTRACT

A missile launcher and missile snubbing apparatus (32) includes a pair snubber blocks (34, 36) slideable along angled side edges of a wedge (38). The snubber blocks (34, 36) are biased by respective springs (48, 50) in a first direction, while the wedge (38) is biased in an opposite direction by a spring (84). A spring biased cam (86) is operative to move the wedge (38) in a direction to reduce the effective width of the snubber block assembly (32) so that a missile can be downloaded from the rear of the launcher (10). A spring clip (85) is engageable with a rod (43) attached to the block (38), and responsive to the action of the cam (86) for locking the wedge (38) in a first position. The spring clip (85) is shaped so as to be responsive to the downloading of the missile (12) for releasing the locked wedge (38).

15 Claims, 3 Drawing Sheets

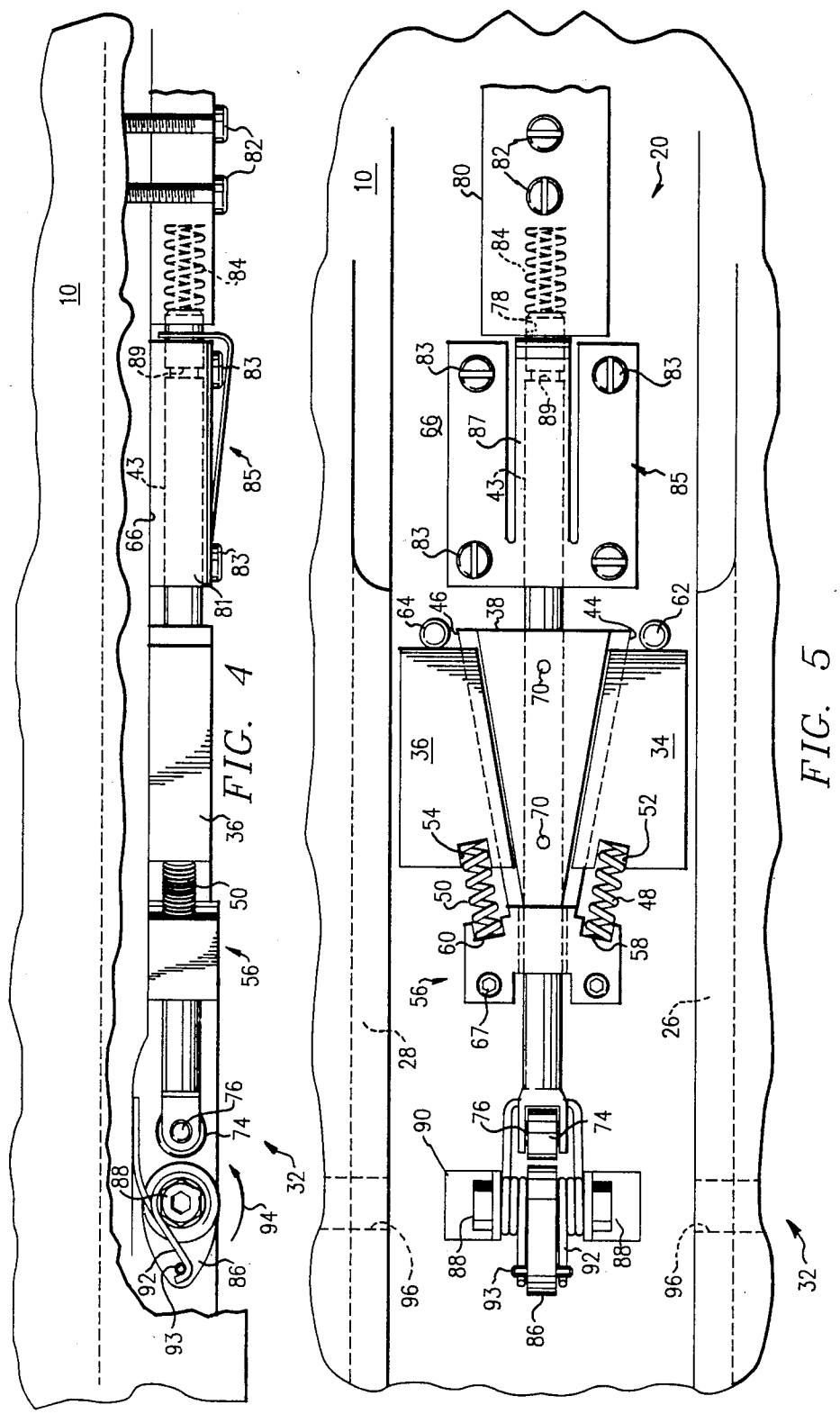

AIRCRAFT MISSILE LAUNCHER SNUBBER APPARATUS

TECHNICAL FIELD OF THE INVENTION

The present invention relates in general to apparatus for mounting missiles to aircraft launching equipment, and more particularly relates to a device for securing a missile hanger within a launcher rail to prevent wobbling or lateral play, while yet allowing the missile to be freely launched forwardly, or downloaded rearwardly.

BACKGROUND OF THE INVENTION

Missile launchers are typically utilized for mounting missiles to an aircraft. Conventional missile launchers are constructed as elongate tubular structures for housing electrical apparatus for interfacing the missile to the controls of the aircraft. Launchers may also be equipped with a liquid nitrogen supply for missile infrared sensors, as typically used on Sidewinder-type missiles.

Formed on the bottom side of the launcher is an elongate track or rail to which the missile is slideably attached. The missile is equipped with a "T" shaped hanger formed on the top side thereof for slideable engagement with the launcher rail. As can be appreciated, the missile hanger must be able to freely slide along the launcher rail without interference. Mounted at the front of the launcher is an operator or pilot-controlled missile restraining mechanism for fixing the missile hanger and launcher rail structures together. In this manner, the missile cannot be thrust forward until it has been ignited by the pilot, and cannot be launched until the requisite amount of rocket thrust has been developed. Missiles which have not been launched during flight are downloaded from the launcher by manually removing them rearwardly out of the rail of the launcher. The missile restraining mechanism prevents downloading of the missiles from the front of the launcher.

Because the missile hanger must be freely slideable along the launcher rail, these structures cannot be formed or machined with close tolerances. As a result, there is a certain amount of wobble or play which inherently exists between the missile and associated launcher. Any tendency of the missile to wobble with respect to the launcher creates a potential for fatigue of the parts and eventual damage. In addition, missile wobble can create aerodynamic instability, especially in high speed flight, and thus affect the aircraft or the missile itself.

Snubbing apparatus heretofore developed has been somewhat effective for reducing the play between the launcher and attached missile apparatus, but has been troublesome in downloading an unfired missile. Such snubbing apparatus is constructed with a scissors-like mechanism which is spring loaded for forcing wedge-shaped scissors end devices outwardly into a gap between the missile hanger apparatus and the launcher rail. The small contact area therebetween causes rapid wear of the wedges. In addition, the sharp angle of the wedge causes the wedges, in many instances, to become so tightly wedged in the gap that damage to the snubbing apparatus is a frequent occurrence when downloading a missile. The snubbing apparatus also includes a cam and push rod retraction assembly which also is subject to frequent damage during the downloading procedure when the wedges become jammed in the gap.

It can be seen from the foregoing that a need exists for a method and apparatus for removing any wobble or play between the missile and launcher mounting parts, without affecting or interfering with the ejection of the missile or the downloading thereof.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts throughout the views, and in which:

FIG. 4 is a side view of a portion of the missile launcher, cut away to illustrate the snubber equipment of the invention;

FIG. 5 is a bottom view of a missile launcher illustrating the snubber of the invention fastened in the launcher rail;

DETAILED DESCRIPTION OF THE INVENTION

Figure 1:
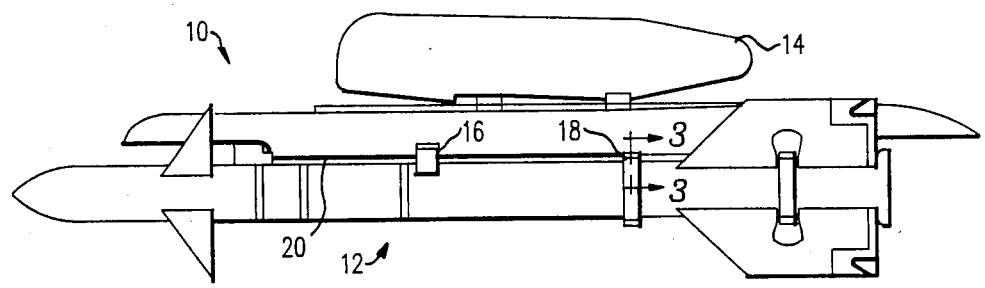
FIG. 1 is a side elevational view of a missile launcher and attached missile, as fastened to an aircraft pylon.
Figure 2:
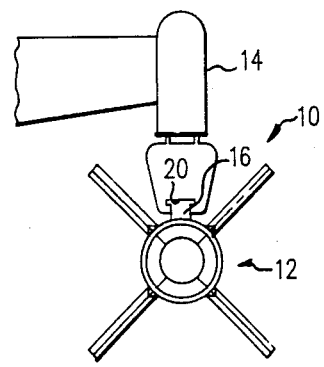
FIG. 2 is a front elevational view of the missile launcher and equipment shown in FIG. 1.

FIGS. 1 and 2 illustrate respectively side and frontal views of an exemplary missile launcher 10 and attached missile 12, the combination of which is fixed in a depending manner from an aircraft wing or pylon 14. In accordance with conventional launching techniques and apparatus, the launcher 10 is removeably fixed to the aircraft pylon 14. The missile 12 is slideably attached to the launcher 10 for support thereof during flight, and from which the missile 12 can be launched when desired. A conventional missile 12 is attached to the launcher 10 at two points by a pair of hangers 16 and 18 which are slideable within a rail 20 which extends generally the entire length of the launcher 10.

While the missile equipment is shown in the figures slung from below an aircraft pylon, and in the example from a helicopter, the missile launcher 10 and attached missile 12 can also be fixed to the aircraft in a position rotated 90° from that shown. The missile hanger supports 16 and 18 are thus adapted to slide in the launcher rail 20, irrespective of the orientation of the apparatus. The missile hangers 16 and 18 are constructed to fit loosely within the launcher rail 20 to provide the tolerance necessary for ensuring that the missile 12 is free to slide out of the launcher 10 when deployed.

In order to properly deploy a missile 12, it must be initially prevented from moving with respect to the launcher 10 until sufficient thrust has been developed by the missile rocket engine. The front hanger support 16 comprises a conventional T-shaped hanger slideable within the T-shaped launcher rail 20. In addition, the missile launcher includes a conventional restraint or detent mechanism (not shown) for preventing slideable movement of the missile hanger 16 with respect to the launcher 10, until the requisite thrust has been developed by the missile 12. At the appropriate time, the restraint mechanism automatically releases its engagement with the missile hanger 16, thereby permitting the missile 12 to be ejected therefrom to follow an intended trajectory. The details of the detent mechanism are well known in the art, and will not be further discussed here.

Figure 3:
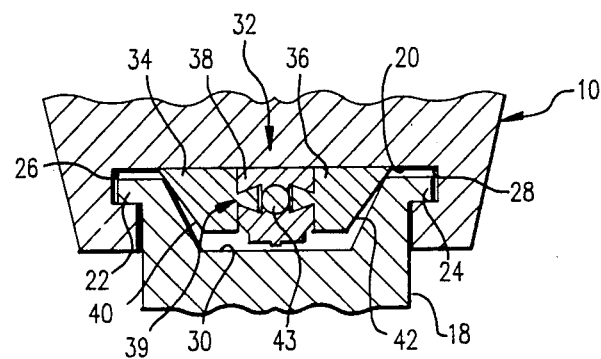
FIG. 3 is an enlarged partial sectional view of the missile and launcher, taken along line 3—3 of FIG. 1.

FIG. 3 illustrates the details of the apparatus by which the missile 12 is made slideable with respect to the launcher 10. Specifically shown is the rear hanger support 18 of the missile 12 loosely fitting within the T-shaped launcher rail 20. The missile hanger 18 is constructed with a pair of outwardly disposed ears 22 and 24 which are slideable within corresponding lateral recesses 26 and 28 forming a part of the rail 20. The missile hanger 18 additionally includes a channel or depressed area 30 on the top surface thereof for accommodating the snubber apparatus of the invention, generally designated as reference character 32. As will be discussed in more detail below, the snubber apparatus 32 is fixed to the missile launcher 10 generally in the vicinity of the rear missile hanger 18. The snubber apparatus 32 is constructed so as not to interfere with either the forward loading of the missile 12 into the launcher 10, or the downloading of the missile 12 rearwardly from the launcher 10, or the forward deployment of the missile 12 out of the launcher 10. Equally as important, the snubber apparatus 32 substantially reduces the play of the missile hanger 18 within the launcher rail 20 by providing an automatic expandable and manually contractable wedge therebetween.

Briefly described, the snubber apparatus 32 includes a pair of snubber blocks 34 and 36 which are slideably attached to a wedge 38, the latter of which is moveably positioned within the rail 20 of the launcher 10. The snubber blocks 34 and 36 are made slideable with respect to the wedge 38 by a dovetail joint arrangement 39. The snubber blocks 34 and 36 are biased with respect to the wedge 38 so as move to a position in which the snubber apparatus 32 is expanded in width. The snubber apparatus 32 thus functions as a wedge to take up the play between the missile hanger 18 and the launcher rail 20. As noted in FIG. 3, the snubber blocks 34 and 36 include respective angled surfaces 40 and 42 for wedging between the missile hanger ears 22 and 24 and the respective launcher rail slots 26 and 28. To be discussed in more detail below, the wedge 38 is fixed to a rod 43 which can be manually moved and locked in a position so that the snubber blocks 34 and 36 are located on the narrower part of the wedge. The missile 12 can then be easily downloaded from the rear of the launcher 10.

FIGS. 4 and 5 illustrate the detailed construction of the missile launcher snubber apparatus 32 of the invention. The snubber apparatus 32 constructed in accordance with the invention includes the noted pair of snubber blocks 34 and 36 which are made slideably engageable along angled side edges 44 and 46 of the wedge 38. The engaging edges of the snubber blocks 34 and 36 and the wedge 38 include mating dove-tail mortise and tenons forming dove-tail joints which maintain the blocks 34 and 36 slideably attached to the wedge 38. As can be seen from FIG. 5, when the snubber blocks 34 and 36 move to the right along the inclined dove-tail joint edges 44 and 46 of the wedge 38, the width of the snubber apparatus 32 is effectively increased.

Each snubber block 34 and 36 is maintained biased with respect to the wedge 38 by respective springs 48 and 50. Each snubber block 34 and 36 includes a circular recess 52 and 54 for receiving therein an end of the respective springs 48 and 50. An anchor block 56 is provided with similar circular recesses 58 and 60 for capturing the other end of the springs 48 and 50. The springs 48 and 50 bias the respective snubber blocks 34 and 36 to the right, as shown in FIG. 5, until such blocks abut respective stop pins 62 and 64 fastened within the top surface 66 of the launcher rail 20.

The wedge 38 is moveably positioned within the rail 20 of the launcher 10 by a rod 43 which passes through the wedge 38 and is fixed thereto by a pair of rivets or pins 70. One end of the rod 43 also passes through a sleeve or bore in the anchor block 56. The anchor block 56 is fastened to the top surface 66 of the launcher rail 20 by a pair of screws 67. The terminal end of the rod 43 is forked for holding therein a roller 74. The roller 74 is fixed within the forked end of the rod 43 by a pin 76. The other end of the rod 43 is disposed within a bore 78 formed in the end of another anchor block 80. Anchor block 80 is fixed to the upper surface 66 of the launcher rail 20 by a number of screws, such as 82. A compression spring 84 is located within the bore 78 for biasing the rod 43, and thus the wedge 38, to the left in FIG. 5. The wedge 38 is thus biased in a direction opposite the biasing of the snubber blocks 34 and 36.

Additional support is supplied to the rod 43 by a support block 81 which includes a bore for slideably receiving the rod 43. The support block is secured to the launcher housing top surface 66 by a number of screws 83. The support block 81 is of such size as not to interfere with the movement of the snubber blocks 34 and 36 or the wedge 38. Also, a latching spring clip 85 has a pair of legs which are anchored to the support block 81 by the screws 83, as well as a tensioned arm 87 which has an irregular shaped hole in an upturned end thereof. The rod 43 extends through the irregular shaped hole for latching engagement with an annular groove 89. The latching arrangement will be described in more detail below.

A rotatable cam 86 is mounted to the rail top surface 66 adjacent the roller 74. Integral with the cam 86 is a pair of bolt heads 88 which can be manually rotated to rotate the cam 86. An allen-type socket can also be formed in the ends of a bearing shaft which is constructed integral with said cam 86. The cam 86 is rotatable within a bracket 90 which is fixed by screws, or otherwise, to the top surface 66 of the launcher rail 20. A torsion spring 92 is fixed with respect to the cam 86 to return the cam 86 to a rest position, as shown in FIG. 4. A pin 93 fixes the ends of the return spring 92 to the cam 86. When the cam 86 is rotated by turning either of the hex heads 88, or by the allen socket, in the direction of the arrow 94, the oblong portion of the cam 86 forces the roller 74 to the right, thereby also moving the rod 43 and attached wedge 38 and compressing the spring 84.

Access openings 96 in opposing sides of the body of the launcher 10 provide access to the hex heads 88 or the allen sockets for rotation of the cam 86 in the noted direction. When the cam 86 is released, such as when a wrench is removed from the hex head 88, the cam 86 returns to the rest position shown in FIG. 4 by the action of the return spring 92. The spring 84 then forces the rod 68 and attached wedge 38 to the left (FIG. 5), thereby causing an increase in the width of the snubber apparatus 32.

Figure 6:
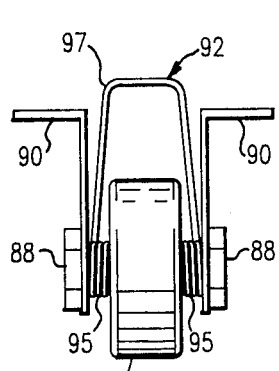
FIG. 6 is an end view of the spring loaded cam which is manually operable to release the snubber apparatus from engagement with the missile hanger.

The cam arrangement is shown in more detail in FIG. 6. The cam 86 has a bearing shaft fixed therethrough and to which the hex heads 88 are fixed. Two angle brackets 90 are utilized to fix the cam in a rotatable manner with respect to the top surface 66 of the launcher rail. Screws may be utilized to fix the top short sections of the angle brackets to the launcher rail top surface 66. The longer angle bracket sections include bearing holes through which the bearing shaft of the cam 86 is inserted. The hex heads 88 capture the angle brackets 90 on the cam bearing shaft. The cam return spring 92 also includes a pair of coiled sections 95 captured on the cam bearing shaft by the hex heads 88. The cam return spring 92 includes a bail section 97 which connects the coiled sections 95 and which provides an extended section engageable with the top surface 66 of the launcher rail. The cam arrangement is installed in the launcher 10 by engaging the return spring ends behind the pin 93, rotating the bail section 97 of the spring away from the spring ends, and fixing the brackets 90 to the top surface 66 of the launcher 10. The cam return spring 92 is thus always under a torsional tension to maintain the cam to be in the rest position shown in FIG. 4. When the cam 86 is manually rotated, the cam return spring 92 is placed in further tension, as movement of the bail 97 of the return spring 92 is prevented by its engagement with the top surface 66 of the launcher rail.

Figure 7:
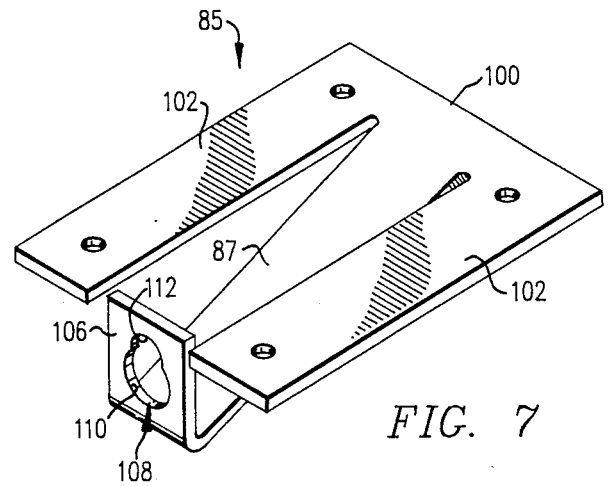
FIG. 7 is a perspective view of the leaf spring which is effective to latch the snubber apparatus in a latched position.

In accordance with another feature of the invention, a spring clip 85 is provided for locking the wedge 38 in a desired position after the cam 86 has been rotated. Particularly, the wedge 38 can be locked in a position to the right so that the snubber apparatus 32 is reduced in overall width. The latching arrangement comprises the spring clip 85 releasably engageable with the annular slot 89 formed around the rod 43. The spring clip 85 is constructed of a durable resilient beryllium copper sheet material, or other suitable material, and is fixed to the launcher housing 10 by being secured to the upper rail surface 66 with the support block 81. FIG. 7 illustrates the construction of the spring clip 85. The spring clip 85 includes a base portion 100 with a pair of legs 102, each with a pair of holes through which the support block fasteners 83 pass. The spring clip 85 further includes a spring arm 87 which forms an acute angle with respect to the base portion 100. The spring arm 87 is angled to function as a ramp for engagement with the missile hanger 18 when the hanger moves, such as for downloading, to the right in FIG. 4. An upturned end section 106 of the spring arm 87 has formed therein a key-hole shaped aperture 108. The aperture 108 includes a large opening 110 with a diameter sufficient for receiving the rod 43. The large opening 110 opens into a smaller opening 112 through which the rod portion 43 will not pass. However, the opening 112 is dimensioned to receive therein the annular groove 89 of the rod 43.

FIGS. 5 and 8–12 illustrate the operational features of the missile launcher snubber apparatus 32 of the invention. FIG. 5 depicts the initial position of the snubber apparatus 32 before a missile 12 has been loaded into the launcher 10. In this instance, the wedge 38 is biased to its left-most position by spring 84, while the snubber blocks 34 and 36 are biased to their right-most positions by respective springs 48 and 50. In this position, the snubber blocks 34 and 36 are maximally separated by the wedge 38, and are therefore at their maximum effective width.

Figure 8:
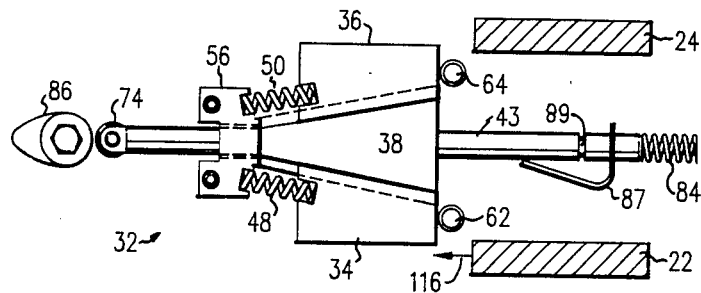
FIGS. 8-12 illustrate the snubber of the invention during various sequences of the loading and the unloading of a missile from the launcher.
Figure 9:
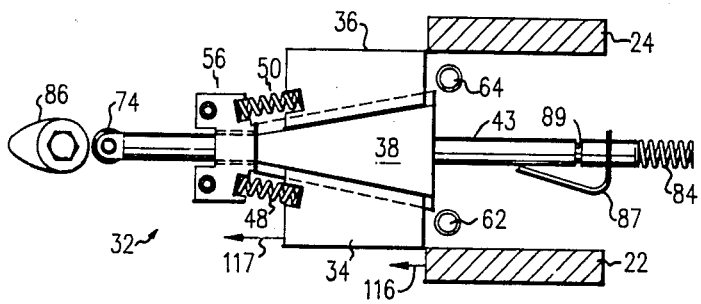

For clarity of understanding, FIGS. 8–12 show the snubber apparatus 32 in simplified detail, with the cam 86 and roller 74, and spring arm 87 of the spring clip 85 rotated ninety degrees from positions assumed in actual practice. FIG. 8 illustrates the snubber apparatus 32 and, the missile hanger ears 22 and 24 as the missile hanger 18 is being moved in a forwardly direction, as noted by arrow 116. The snubber blocks 34 and 36, being at their widest orientation, are wider than the cavity 30 (FIG. 3) formed in the missile hanger 18. However, and as shown in FIG. 9, the continued movement of the missile hanger 18 toward the front of the missile launcher 10 causes the hanger ears 22 and 24 to abut with the snubber blocks 34 and 36 and move them in the direction shown by the arrow 117. The snubber blocks 34 and 36 are thus moved against the force of the biasing springs 48 and 50 in the same direction as the missile hanger 18 is moved. The movement of the snubber blocks 34 and 36 thus causes the respective springs 48 and 50 to be compressed. As the blocks 34 and 36 are moved down the angled side edge surfaces of the wedge 38, the effective width of the snubber assembly 32 is reduced.

Figure 10:
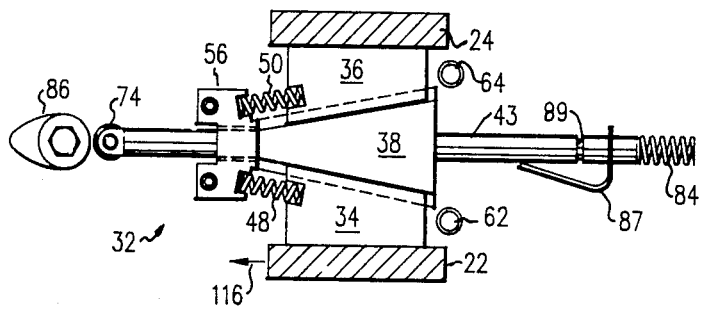

As the missile hanger 18 continues to be forced against the snubber blocks 34 and 36 during loading from the rear of the launcher 10, the effective width of the snubber apparatus 32 eventually becomes smaller than the inside lateral dimension of the hanger cavity 30, whereby the snubber blocks 34 and 36 pass through the cavity 30. This is shown in FIG. 10 of the drawings. The missile hanger 18 is then free to move in the direction 116 as the continued engagement thereof with the snubber blocks 34 and 36 tends to maintain the effective width of the snubber assembly 32 reduced. It can be appreciated that any interference of the snubber blocks 34 and 36 with the loading or firing of the missile 12 is negated, as the missile 12 moves in the same direction whether loading or firing.

When the missile 12 is loaded into the launcher 10 and latched thereto by the frontal restraint mechanism 16, the rear-most missile hanger 18 is located with respect to the snubber blocks 34 and 36, as shown in FIG. 10. This position is preferable as the snubber blocks 34 and 36 are somewhat intermediate the stop pins 62 and 64 and a fully compressed state of the respective springs 48 and 50. Importantly, the springs 48 and 50 bias the respective snubber blocks 34 and 36 rearwardly (to the right) and thus form a wedge between the missile hanger 18 and the launcher rail 20. This is also illustrated in FIG. 3. Any vibration or movement of the missile hanger 18 allows the spring tensioned snubber blocks 34 and 36 to work backwardly, thereby further reducing any play between the missile hanger 18 and the launcher rail 20. When the noted play is substantially eliminated, or reduced, the tendency of the missile 12 to wobble during flight is also reduced. The aerodynamic performance of the missile is thus improved, as well as the reliability of the entire structure.

When it is desired to launch the missile 12, the forward movement of the missile 12 and the hanger 18 effects an automatic disengagement thereof from the snubber blocks 34 and 36. As during loading, the firing of missile 12 moves the snubber blocks 34 and 36 down the angled side edges of the wedge 38, thereby reducing the effective width of the snubber apparatus 32. After the missile 12 has been launched, the snubber blocks 34 and 36 are forced rearwardly by respective springs 48 and 50 until stopped by stop pins 62 and 64. The loading of another missile can then be accomplished by the same procedure noted above.

In the event that the missile 12 has not been launched, the snubber assembly 32 is constructed to allow easy downloading of the missile by removing it rearwardly from the launcher 10. As can be appreciated from FIG. 10, the movement of the missile hanger ears 22 and 24 opposite the direction of arrow 116 is difficult, as the snubber blocks 34 and 36 only become more tightly wedged. As noted above, the missile 12 cannot be downloaded from the front, because of interference by the restraint mechanism 16.

Figure 11:
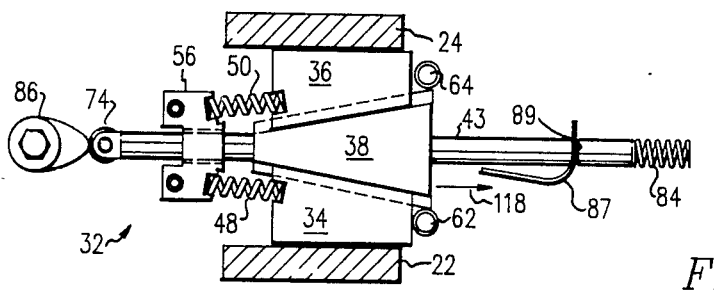
Figure 12:
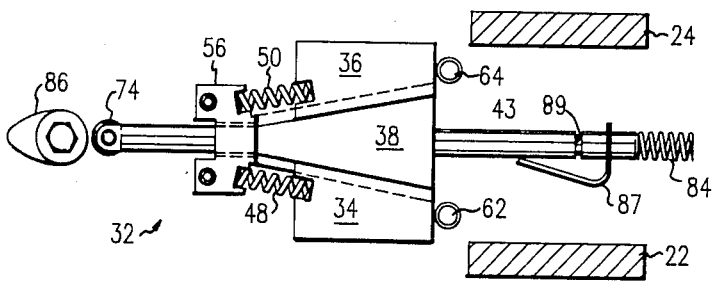

The snubber assembly 32 of the invention allows easy downloading from the rear of the launcher 10 by rotating the cam 86 about 180 degrees. As illustrated in FIG. 11, when rotated, the lobe of the cam 86 engages the roller 74 and forces the rod 43, and thus the wedge 38, in the direction of arrow 118. Spring 84 thus becomes compressed. The snubber blocks 34 and 36 are thus moved to the narrower end of the wedge 38 and the effective width of the snubber apparatus 32 is reduced. While the springs 48 and 50 force the respective snubber blocks 34 and 36 to their right-most positions in abutment with the stop pins 62 and 64, the overall effective width of the snubber assembly 32 is less than the lateral distance of the missile hanger cavity 30. As a result, the engagement between the snubber blocks 34 and 36 and the missile hanger 18 is released, thereby allowing the missile to be downloaded at the rear of the launcher 10. The spring 92 returns the cam 86 to its initial position when the wrench is released from the nut 88.

In accordance with yet another feature of the invention, when the cam 86 is rotated to force the wedge 38 and attached rod 43 to the right, the wedge 38 and rod 43 are locked in such position by the action of the spring clip 85. FIG. 11 illustrates a side view of the spring clip position when locked within the annular groove 89 of the rod 43. As the rod 43 is forced in the direction of arrow 118 by the action of the cam movement, the outside surface of the rod 43 moves through the larger hole 110 of the spring arm 87. However, when the rod 43 is moved to a position wherein the annular groove 89 therein is aligned with the smaller diameter spring clip arm opening 112, the spring clip arm 87 moves downwardly according to its natural biasing, whereby the smaller hole 112 becomes engaged within the groove 89 of the rod 43. The spring clip 85 is formed so that the rest position of spring arm 87, due to the angle formed between spring clip base section 100 and the spring arm 87, is in a direction away from the top surface 66 of the launcher rail 20. Once the smaller spring clip opening 112 is engaged within the annular groove 89 in the rod 43, the wedge 38 is prevented from being forced by the spring 84 in the direction opposite arrow 118. The missile hanger 18 can then be moved free from the snubber block assembly 32.

When the missile hanger 18 has been moved rearwardly free from the snubber blocks 34 and 36, the rear edge of the hanger 18 engages the ramp section of the spring clip arm 87 and forces the apertured upturned section 106 upwardly. When spring clip end section 106 is thus forced upwardly a sufficient amount, the larger opening 110 becomes aligned with the rod 43, thereby releasing the rod 43 and allowing the compression spring 84 to force the wedge 38 to the position shown in FIG. 12. This forces the snubber blocks 34 and 36 apart, thereby effectively increasing the width of the snubber apparatus 32. The widening of the snubber apparatus 32 has no effect of the further movement of the missile hanger 18, as such hanger 18 is completely clear of the snubber blocks 34 and 36 when the wedge 38 and rod 43 have been released from engagement by the spring clip 85. With the disengagement of the spring clip 85 from the rod 43, the snubber apparatus 32 is automatically ready for the loading of another missile and the engagement with the hanger thereof.

From the foregoing, missile launcher snubber apparatus has been disclosed which allows a missile to be easily loaded forwardly into launcher equipment, and downloaded from the rear of the launcher. Provided are a pair of snubber blocks which take up any play existing between a missile hanger and the missile launcher rail. The snubber block apparatus is constructed so as not to interfere with the normal forward launching of the missile. The snubber apparatus is further constructed so that in response to a single rotation and release of a cam assembly, the snubber apparatus is effectively locked in a narrowed position so that the missile can be downloaded from the back of the launcher. As the missile is removed rearwardly from the launcher, the missile hanger apparatus is effective to release the snubber apparatus from its latched condition, thereby automatically placing the snubber apparatus in condition for the subsequent loading of another missile.

While the preferred embodiment of the invention has been disclosed with reference to a specific missile launcher snubber apparatus, it is to be understood that many changes in detail may be made as a matter of engineering choices without departing from the spirit and scope of the invention, as defined by the appended claims.

What is claimed is:

1. Apparatus for use with a missile having a hanger structure moveable with respect to a launcher having a rail structure, comprising:
    a pair of snubber blocks engageable with the hanger structure and the rail structure to effect frictional engagement therebetween, each said block having an angled surface;
    a moveable wedge having opposing angled surfaces slideably engageable with the respective angled surfaces of said snubber blocks; and
    means for maintaining said wedge in a first position for allowing said snubber blocks to move with respect to said wedge in response to missile movement for effecting lateral expansion of said apparatus to frictionally lock said missile hanger structure to said launcher rail, and for moving said wedge to a second position to prevent said lateral expansion and thereby allow said missile hanger structure to move freely within said launcher rail.

2. The apparatus of claim 1 further including push means for moving said wedge in a direction opposing said snubber block biasing means and latching said wedge at said second position.

3. The apparatus of claim 2 wherein said push means includes a cam responsive to a rotational movement thereof for moving said wedge to said second position.

4. The apparatus of claim 1 further including means for latching said wedge at said second position.

5. The apparatus of claim 4 further including release means responsive to the removal of said missile hanger structure from said launcher rail structure for releasing said latching means.

6. The apparatus of claim 4 further including means for biasing said snubber blocks to a position with respect to said wedge to widen said apparatus.

7. The apparatus of claim 6 further including means for biasing said wedge in a direction opposite the biasing of said snubber blocks.

8. A snubber for frictionally engaging a missile hanger structure to a launcher rail structure, comprising:
- a pair of snubber blocks each having an outside surface substantially parallel with respect to each other, and each having an angled inside surface;
- a wedge having angled outside surfaces each slideably engageable with a respective angled inside surface of each said snubber block;
- an elongate rod fixed to said wedge and operative to move said wedge with respect to said snubber blocks to effect lateral expansion of said snubber blocks and thereby frictionally engage said missile hanger structure to said launcher rail structure;
- means for biasing said snubber blocks for slideable movement with respect to said wedge to maintain said lateral expansion;
- means for biasing said rod in a direction opposite said biasing of said snubber blocks;
- cam means responsive to a rotational movement thereof for pushing said rod in a direction causing said snubber to become laterally contracted; and
- latch means for latching said rod so that said snubber remains laterally contracted.

9. The snubber of claim 8 wherein said cam means includes a roller fixed to said rod.

10. The snubber of claim 8 further including means for preventing said snubber blocks from moving longitudinally beyond a predefined position to thereby limit the slideable movement thereof with respective to said wedge.

11. The snubber of claim 8 further including means for rotationally biasing said cam means to a predefined angular position.

12. The snubber of claim 8 wherein said latch means comprises an annular groove in said rod and a etationary spring clip for engagement with said annular groove.

13. The snubber of claim 12 wherein said spring clip includes a first opening for receiving said rod therethrough, and a second opening smaller than said first opening for receiving therein said annular groove.

14. The snubber of claim 12 wherein said spring clip includes a part thereof protruding outwardly when said second opening is engaged with said annular groove, whereby when said missile hanger structure is moved in said launcher rail structure, said hanger structure engages said protruding part and said spring clip becomes disengaged from said annular groove.

15. Apparatus adapted for snubbing a missile to a missile launcher, said missile and launcher being of the type having members slideably engageable, comprising:
- a pair of elements slideable along common inclined surfaces therebetween so that slideable movement in a first direction causes a lateral expansion of the width of the combined pair of said elements, and movement in an opposite direction causes a lateral contraction of said pair of elements;
- means for moving one said element with respect to the other said element to place said elements in said contracted position;
- latching means for latching said elements in said contracted position to facilitate movement of missile with respect to the launcher; and
- means responsive to the removal of the missile from the launcher for releasing the latched condition of said elements so that the missile is frictionally engaged to the launcher.

* * * * *